United States Patent [19]

Matthews et al.

[11] Patent Number: 5,809,558
[45] Date of Patent: Sep. 15, 1998

[54] METHOD AND DATA STORAGE SYSTEM FOR STORING DATA IN BLOCKS WITHOUT FILE REALLOCATION BEFORE ERASURE

[75] Inventors: Walter S. Matthews, Folsom; Markus A. Levy, El Dorado Hills, both of Calif.

[73] Assignee: Intel Corporation, Santa Clara, Calif.

[21] Appl. No.: 819,688

[22] Filed: Mar. 17, 1997

Related U.S. Application Data

[63] Continuation of Ser. No. 314,852, Sep. 29, 1994, abandoned.

[51] Int. Cl.⁶ .................................................. G06F 12/02
[52] U.S. Cl. .......................... 711/173; 711/103; 707/205
[58] Field of Search ..................................... 395/430, 621, 395/622, 497.01, 497.02, 497.03, 497.04; 711/103, 170, 171, 172, 173; 707/205, 206

[56] References Cited

U.S. PATENT DOCUMENTS

| | | | |
|---|---|---|---|
| 4,775,932 | 10/1988 | Oxley et al. | 707/206 |
| 4,797,810 | 1/1989 | McEntee et al. | 707/206 |
| 4,800,520 | 1/1989 | Iijima | 707/206 |
| 4,802,117 | 1/1989 | Chrosny et al. | 395/182.03 |
| 4,896,262 | 1/1990 | Wayama et al. | 395/500 |
| 5,200,959 | 4/1993 | Gross et al. | 371/21.6 |
| 5,270,979 | 12/1993 | Harari et al. | 365/185.09 |

FOREIGN PATENT DOCUMENTS

| | | |
|---|---|---|
| 2088442 | 1/1993 | Canada . |
| 0175458 | 3/1986 | European Pat. Off. . |
| 0392895 | 10/1990 | European Pat. Off. . |
| 2251323 | 7/1992 | United Kingdom . |
| 2251324 | 7/1992 | United Kingdom . |

OTHER PUBLICATIONS

Steven Wells et al., "Flash Solid–State Drive with 6MB/s Read/Write Channel and Data Compression," *Flash Memory: Volume II*, Intel Corporation, pp. 10–1 through 10–2 (1993).

Walter Chen, "Flash: Big News in Storage?," *Flash Memory: vol. II*, Intel Corporation, pp. 10–4 through 10–6 (1993).

"Flash Drive iFD005P2SA/iFD010P2SA," *Flash Memory: vol. II*, Intel Corporation, pp. 7–1, 7–2, 7–4, 7–16, and 7–19 through 7–21 (1993).

Primary Examiner—Eddie P. Chan
Assistant Examiner—Kevin L. Ellis
Attorney, Agent, or Firm—Blakely, Sokoloff, Taylor & Zafman

[57] ABSTRACT

A memory management method is provided for a nonvolatile memory having a plurality of blocks each of which can be electrically erased and programmed. A data file to be stored in the nonvolatile memory is received. A number of blocks that are available for data storage are located from the plurality of blocks. The data file is stored in a first block of the number of blocks if the size of the data file is smaller than the total storage space of the first block. The data file is stored in the first block and a second block of the number of blocks if the size of the data file is larger than the total storage space of the first block but smaller than the total storage space of the first and second blocks. Unoccupied space of the first or second block by the data file is not used to store other data files such that no file reallocation operation is needed when the first or second block is to be erased. A data storage system having an erasable and programmable memory and a memory management program is also described.

23 Claims, 6 Drawing Sheets

METHOD AND DATA STORAGE SYSTEM FOR STORING DATA IN BLOCKS WITHOUT FILE REALLOCATION BEFORE ERASURE

This is a continuation of application Ser. No. 08/314,852, filed Sep. 29, 1994, now abandoned.

FIELD OF THE INVENTION

The present invention pertains to the field of computer memories. More particularly, this invention relates to a memory management system for a nonvolatile memory that requires minimized storage space and processing power while improving the overall system performance of the memory management system.

BACKGROUND OF THE INVENTION

One type of prior art nonvolatile storage device is a flash memory card. A prior art flash memory card typically includes flash electrically erasable and programmable read only memories ("flash EPROMs"). The prior art flash memory card that employs the flash EPROMs allows data and codes to be stored on the purely solid-state medium of the flash EPROMs. The flash memory card is also referred to as flash solid-state drive. FIG. 1 shows the block diagram of a prior art flash memory card 10.

As can be seen from FIG. 1, flash memory card or drive 10 typically includes a memory array 12 and a microcontroller 11. Memory array 12 typically includes a number of flash EPROMs 12a through 13n, each being electrically erasable and programmable. Microcontroller 11 controls the memory operations of each of flash EPROMs 12a–13n. Microcontroller 11 interfaces with an external host computer system or data processing system (not shown). Microcontroller 11 receives data and code files from the external system. Microcontroller 11 then performs the necessary programming operation to store the data and code files into memory array 12. When the external system requires a particular data or code file stored in memory array 12, the external system sends a command to microcontroller 11. Microcontroller 11 then accesses memory array 12 to read the particular data or code file.

Each of flash EPROMs 12a–13n is also organized into blocks, each block can be individually electrically erased. In this arrangement, each block of each of flash EPROMs 12a–13n can be individually addressed for read, programming, and erasure operations by microcontroller 11. FIG. 2 illustrates the memory organization of memory array 12 of FIG. 1, wherein each of flash EPROMs 12a–13n is organized into erasure blocks.

Referring back to FIG. 1, a system resident file management system (not shown in FIG. 1) manages the data and code files stored in memory array 12. The file management system is also referred to as file system drive. The file system drive defines file structure of memory array 12 for data storage and handles all file management utilities of flash memory card 10. The file structure of memory array 12 indicates how memory array 12 is structured to store data and code files. For example, the file system drive can define a variable-sized file structure or a sector-sized file structure for memory array 12 to store data and code files.

For a variable-sized file structure, a code or data file is stored contiguously in memory array 12, regardless of the size of the file and the block boundary of the blocks of memory array 12. FIG. 2 shows a variable-sized file structure 15 for memory array 12. In FIG. 2, only blocks BLOCKm and BLOCKn are shown for illustration purposes. As can be seen from FIG. 2, files 1 through 4 are stored contiguously in the two blocks.

Disadvantages are, however, associated with such file structure for memory array 12. One disadvantage is that the memory clean-up operation for reallocating storage space for the files stored on memory array 12 is typically relatively less efficient and more frequent. As is known, a block of memory array 12 programmed with data cannot be reprogrammed with new data without a prior erasure. When BLOCKm is to be erased in order to store new files because files 1 and 2 have been deleted, file 3 needs to be reallocated. This typically requires the file system drive to locate a contiguous storage space in memory array 12 that is large enough to store file 3. File 3 is then stored in that newly allocated storage space and BLOCKm can be erased. Because a portion of file 3 is also stored in BLOCKn, the reallocation of file 3 may also cause BLOCKn to be erased in order to claim the dirty space of BLOCKn. This typically causes file 4 to be reallocated and BLOCKn to be erased. Therefore, with a variable-sized file structure, the file reallocation operation for memory array 12 typically takes relatively long time to perform, which in turn affects the overall performance of flash memory card 10.

In addition, the storage space of memory array 12 may not be effectively managed to store files when the variable-sized file structure is employed for memory array 12. As can be seen from FIG. 2, the free space in BLOCKn typically cannot be used unless a file of that size is to be stored in memory array 12. Another disadvantage is that a relatively large storage space of memory array 12 is required to store a file allocation table for the data files stored in memory array 12. Moreover, the overall system performance is also affected because the structure requires relatively significant processing power to process the file allocation information.

As described above, memory array 12 may be structured with the sector-sized file structure. For a sector-sized file structure, memory array 12 stores a code or data file in sectors. For the sector-sized file structure, each block within memory array 12 of FIG. 1 is further arranged into a number of fixed-size sectors. These sectors are analogous to sectors on a prior art hard disk. When a file is to be stored in memory array 12, the file is stored in separately located free sectors. A file allocation table logically concatenates the sectors that store the file in order to form a complete file.

The sector-sized file structure for memory array 12 of flash memory card 10 also bears disadvantages. One disadvantage is that file reallocation is still required in order to erase a block that contains many dirty sectors. Another disadvantage is that a relatively large storage space of memory array 12 needs to be reserved for the file allocation table. This typically affects the overall effective storage of flash memory card 10. Moreover, the overall system performance is also affected because the structure requires relatively significant processing power to process the file allocation information.

SUMMARY AND OBJECTS OF THE INVENTION

One of the objects of the present invention is to minimize the total storage space required for a memory management system for a nonvolatile memory.

Another object of the present invention is to minimize the management processing of a memory management system for a nonvolatile memory so as to improve the overall system performance.

Another object of the present invention is to provide an on-chip memory management system for a nonvolatile memory device that resides in the nonvolatile memory device.

A further object of the present invention is to provide a memory management system for a nonvolatile memory that requires minimized storage space and processing.

A memory management method is provided for a nonvolatile memory having a plurality of blocks each of which can be electrically erased and programmed. A data file to be stored in the nonvolatile memory is received. A number of blocks that are available for data storage are located from the plurality of blocks. The data file is stored in a first block of the number of blocks if the size of the data file is smaller than the total storage space of the first block. The data file is stored in the first block and a second block of the number of blocks if the size of the data file is larger than the total storage space of the first block but smaller than the total storage space of the first and second blocks. Unoccupied space of the first or second block by the data file is not used to store other data files such that no file reallocation is needed when the first or second block is to be erased.

A memory device residing on a single semiconductor substrate is described. The memory device includes a nonvolatile memory array and a microcontroller for controlling memory operations of the memory array. The memory array includes a plurality of blocks, each being electrically erasable and programmable. The memory device also includes a memory management system for managing data files on the memory array. The memory management system is stored within the memory device.

A data storage system is also described. The data storage system includes a nonvolatile memory array that includes (1) a plurality of blocks each of which can be electrically erasable and programmable and (2) an identifier bit in each of the plurality of blocks to indicate if the respective one of the plurality of blocks is available for data storage. A microcontroller is provided for controlling memory operations of each of the plurality of blocks. A memory management program operative on the microcontroller is provided for managing data storage of the nonvolatile memory array. The memory management program accesses the identifier bit in each of the plurality of blocks to locate a number of blocks from the plurality of blocks that are available for data storage. The memory management program stores a data file in a first block of the number of blocks if the size of the data file is smaller than the total storage space of the first block. The memory management program also changes the state of the identifier bit of the first block so as to cause unoccupied space in the first block by the data file not to store other data files such that no file reallocation is needed when the first block is to be erased.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
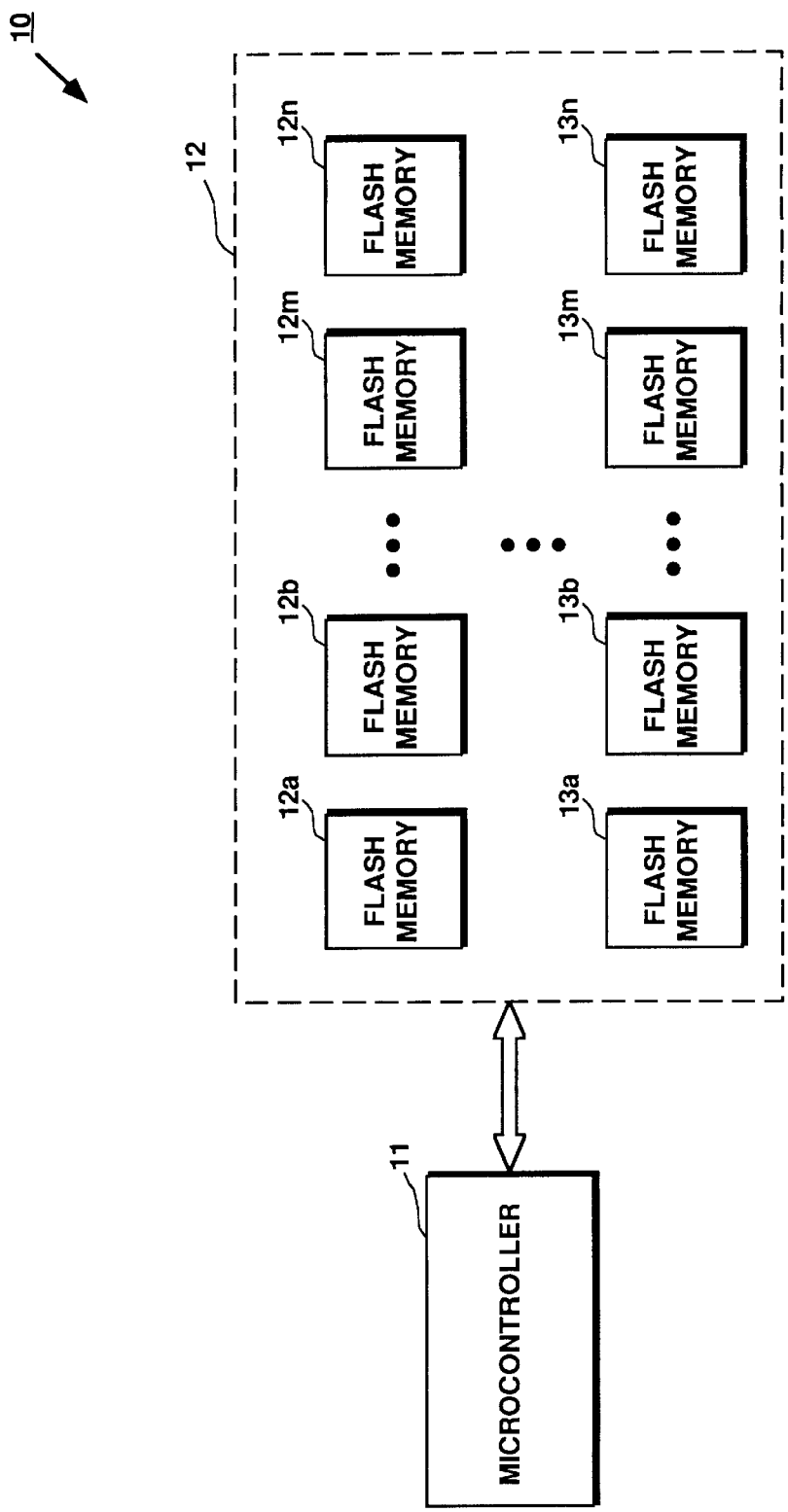
FIG. 1 is a block diagram of a prior art flash memory card having a memory array.
Figure 2:
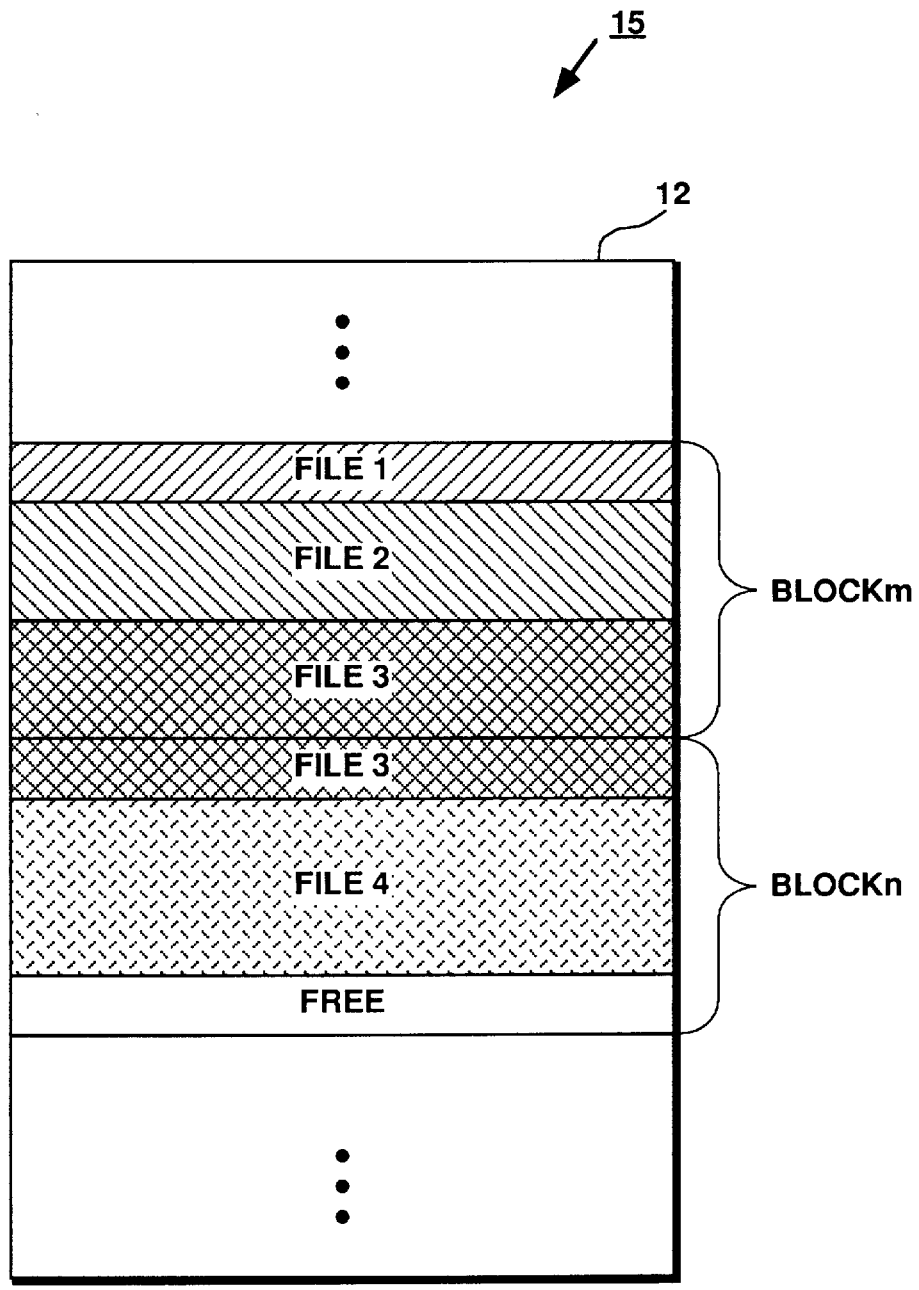
FIG. 2 is a block diagram of the memory array of FIG. 1 with a variable-sized file structure.
Figure 3:
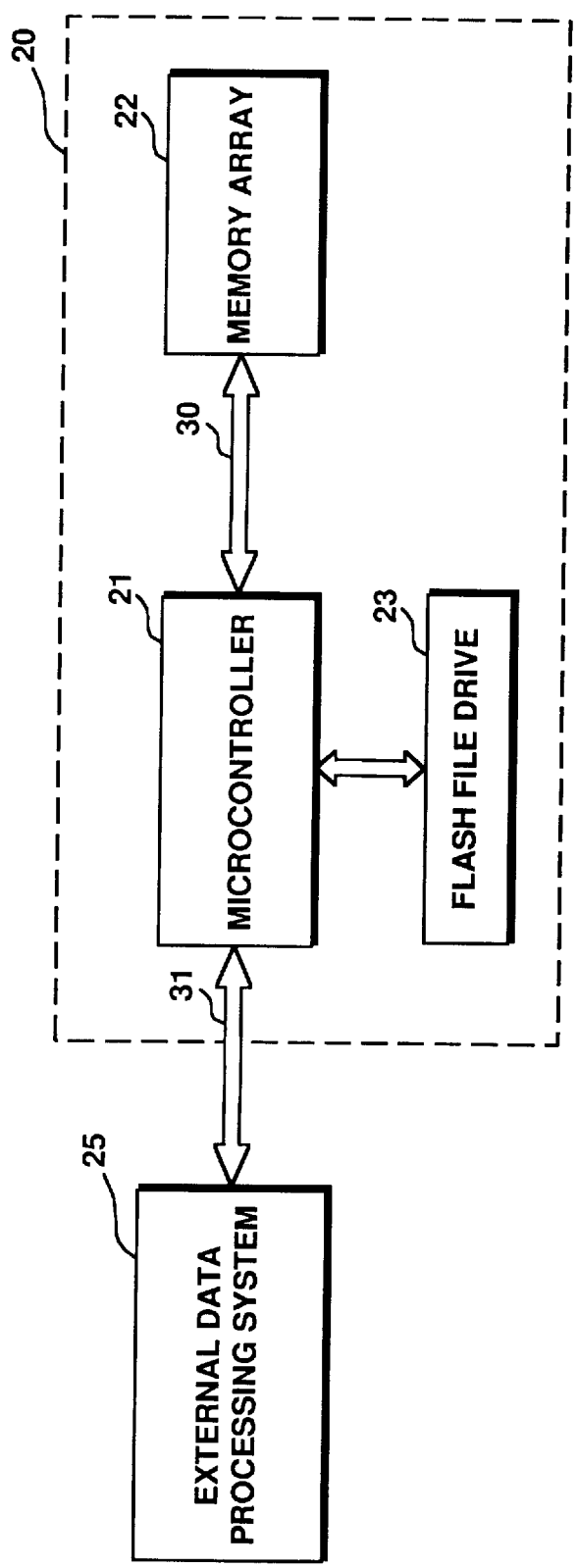
FIG. 3 shows a flash EPROM connected to an external data processing system, wherein the flash EPROM includes a memory array, a microcontroller, and a flash file drive.

FIG. 3 shows the block diagram of a flash EPROM 20 that implements an embodiment of the present invention. As can be seen from FIG. 3, flash EPROM 20 is connected to an external data processing system 25.

External data processing system 25 can be a computer system. External data processing system 25 can also be other types of data processing systems. For example, external data processing system 25 can be a printer system, an answering machine system, a display system, a phone system, a digital camera system, or any other system that requires data storage.

For one embodiment, flash EPROM 20 resides on a single silicon substrate. Alternatively, flash EPROM 20 may not be residing on a single silicon substrate.

As can be seen from FIG. 3, flash EPROM 20 includes a memory array 22 that is made up of flash memory cells for storing data at addresses. For one embodiment, memory array 22 stores 16 Mbits ("megabits") of data.

For one embodiment, each memory cell of memory array 22 can store a single bit of data. For another embodiment, each memory cell of memory array 22 can store multiple bits of data.

Figure 4:
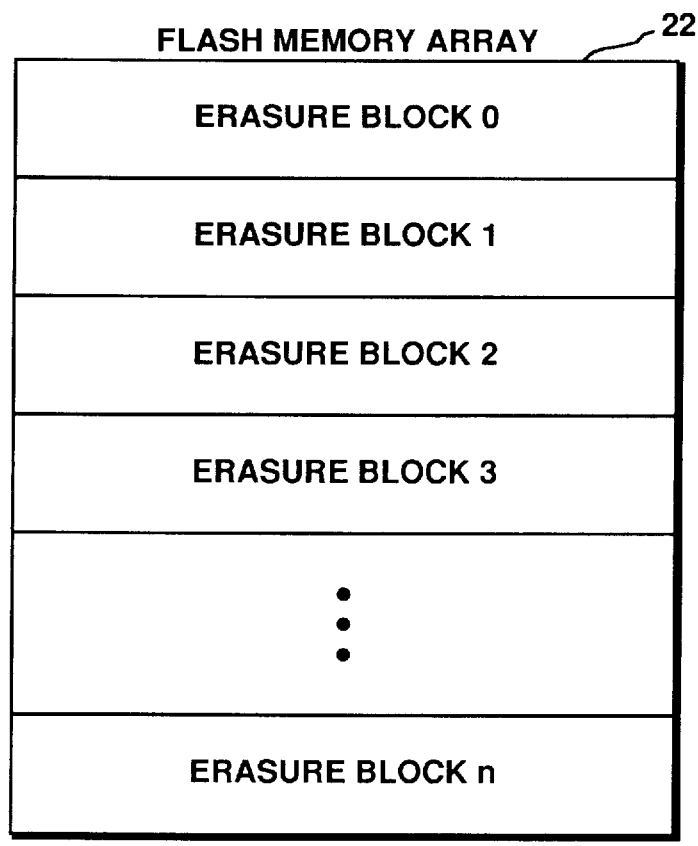
FIG. 4 shows the array organization of the memory array of FIG. 3 that includes a number of blocks.

Memory array 22 is arranged into a number of blocks, each can be individually electrically erased. FIG. 4 shows the array organization of memory array 22 which will be described in more detail below.

As can be seen from FIG. 4, memory array 22 includes a number of erasure blocks BLOCK0 through BLOCKn. Each of blocks BLOCK0 through BLOCKn can store 128 Kbytes ("kilobytes") of data or 64 Kbytes of data. Alternatively, each of blocks BLOCK0 through BLOCKn can be larger than 128 Kbytes or smaller than 64 Kbytes. Furthermore, the size of each of blocks BLOCK0 through BLOCKn may vary from one block to another.

Each of erasure blocks BLOCK0 through BLOCKn of memory array 22 can be individually read, programmed, and erased. This means that each of blocks BLOCK0 through BLOCKn of memory array 22 can be individually accessed for read, programming, and erasure operations. The read and programming operations in a selected block of memory array 22 can be done in a byte wide or word wide manner while the erasure operation erases the entire content of the selected block. This indicates that memory array 22 can be block erased.

Referring back to FIG. 3, flash EPROM 20 also includes a microcontroller 21 connected to memory array 22 via bus 30. Microcontroller 21 is also connected to external data processing system 25 via bus 31. Microcontroller 21 receives data, addresses, and control information from data processing system 25. The control information can include instructions or commands for flash EPROM 20 to perform the required memory operations. Microcontroller 21 in turn controls accesses to memory array 22 in accordance with the data, address, and control information received. Microcontroller 21 controls the memory operations of memory array 22. As described above, the memory operations of memory array 22 include read, programming, and erasure operations.

Moreover, microcontroller 21 executes a flash file drive software 23 to store and read data files to and from memory array 22 of flash EPROM 20, and to manage the data files stored in memory array 22. Flash file drive 23 will be described in more detail below.

Microcontroller 21 can be any kind of known flash memory controller. For one embodiment, microcontroller 21 is implemented by a firmware. Alternatively, microcontroller 21 can be implemented by other known controller circuits.

For one embodiment, microcontroller 21 includes a microprocessor, a volatile memory buffer, and a nonvolatile memory (all are not shown in FIG. 3). Alternatively, microcontroller 21 may include more or fewer elements than those mentioned above.

The volatile memory buffer of microcontroller 21 is used to buffer data to and from memory array 22. The nonvolatile memory of microcontroller 21 can be used to store the basic input/output system software of flash EPROM 20 ("flash BIOS"). The flash BIOS software stored may include (1) drives for certain hardware of flash EPROM 20; (2) a power-on testing program, (3) a start-up routine that initializes the system of flash EPROM 20; and (4) a loader program that reads programs stored in memory array 22 for controlling microcontroller 21. Alternatively, the flash BIOS software may include more or fewer software functions than those mentioned above.

As described above, flash EPROM 20 also includes flash file drive 23. Flash file drive 23 is a software program. For one embodiment, flash file drive 23 forms part of the flash BIOS software stored in microcontroller 21.

For one embodiment, flash file drive 23 is stored in the nonvolatile memory of microcontroller 21. For another embodiment, flash file drive 23 is first stored in memory array 22. A loader program of the flash BIOS software loads flash file drive 23 into microcontroller 21 when flash EPROM 20 is powered on. Alternatively, flash file drive 23 may be stored in other places. For example, flash file drive 23 may be downloaded from data processing system 25 into the volatile memory buffer of microcontroller 21 when flash EPROM 20 is powered on.

Flash file drive 23 is executed by microcontroller 21. Flash file drive 23 is a data file management software that provides data file storage and memory management for flash EPROM 20. Flash file drive 23 intercepts instructions and commands from external data processing system 25 and translates them into flash memory operation terms. Flash file drive 23 also interacts with memory array 22 via microcontroller 21. Flash file drive 23 defines a file structure for memory array 22. Flash file drive 23 transfers data files in memory array 22. Flash file drive 23 also performs clean-up operations to reclaim the dirty space in memory array 22. In one word, flash file drive 23 handles all file system management utilities for flash EPROM 20.

As described above, flash EPROM 20 can reside on a single silicon substrate. When this occurs, memory array 22 and microcontroller 21 are manufactured on a single silicon substrate and flash file drive 23 is stored in memory array 22. When flash EPROM 20 is powered on, microcontroller 21 downloads flash file drive 23 from memory array 22. Microcontroller 21 includes an on-chip cache memory (not shown) to store the downloaded flash file drive 23. Flash file drive 23, when downloaded, controls microcontroller 21 to perform the memory operations with respect to memory array 22 and to manage data files stored in memory array 22. Alternatively, microcontroller 21 does not download flash file drive 23 from memory array 22, but rather directly executes flash file drive 23 from memory array 22 (i.e., execute-in-place).

As described above, microcontroller 21 may also include an on-chip nonvolatile memory that stores flash file drive 23. When this occurs, memory array 22 does not store flash file drive 23 and microcontroller 21 does not download flash file drive 23.

Figure 5:
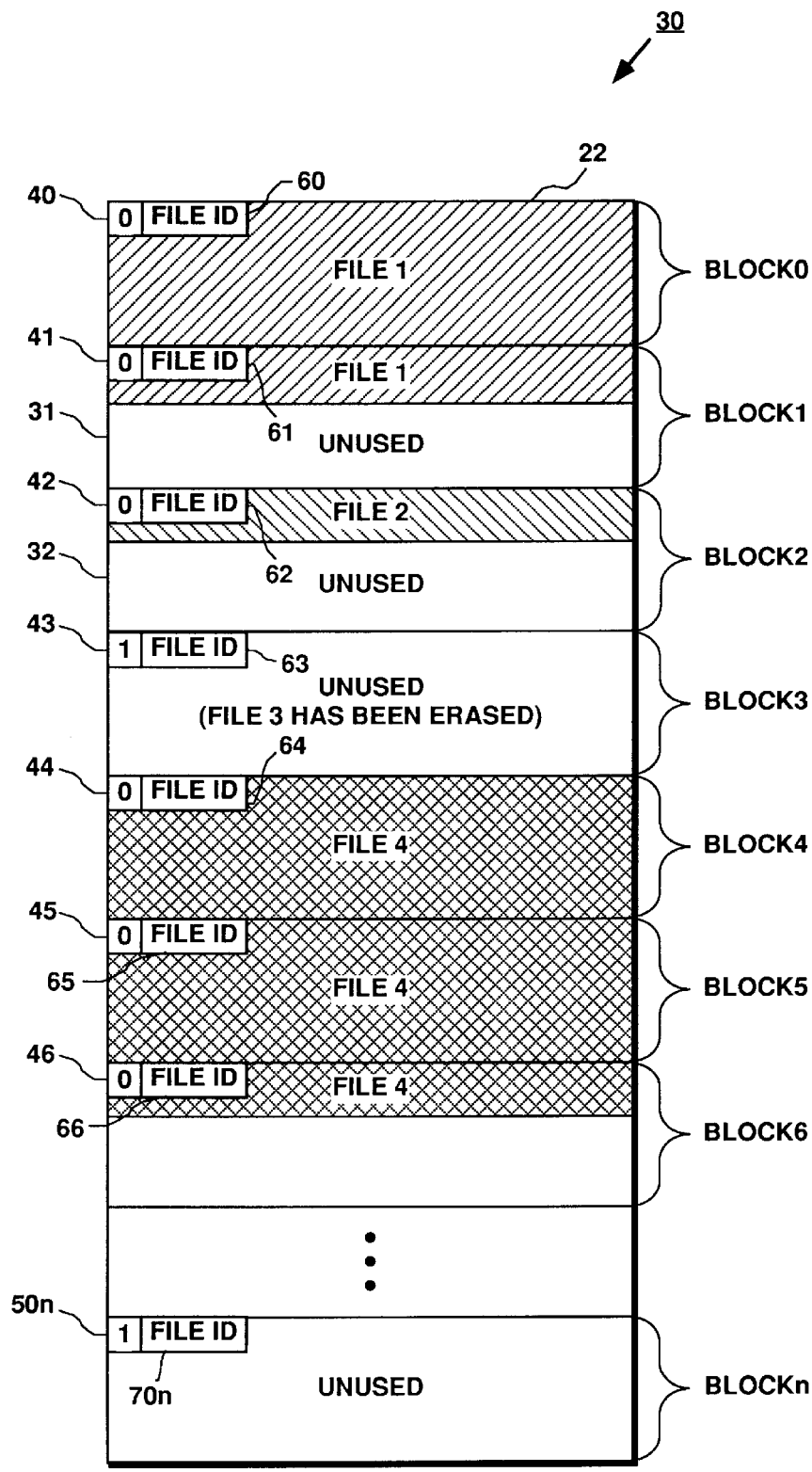
FIG. 5 shows a block-sized file structure for the memory array of FIGS. 3 and 4.

Flash file drive 23 defines a block-sized file structure for memory array 22. The block-sized file structure for memory array 22 defined by flash file drive 23 allows the clean-up operation for memory array 22 to be performed without file reallocation. This increases the system performance of flash EPROM 20 and reduces the processing power required for microcontroller 21. In addition, the block-sized file structure for memory array 22 defined by flash file drive 23 allows data files to be stored in memory array 22 without separately storing file allocation information in memory array 22. This also substantially increases the system performance of flash EPROM 20 and reduces the processing power required for microcontroller 21. FIG. 5 shows memory array 22 with block-sized file structure 30 defined by flash file drive 23, which will be described in more detail.

As can be seen from FIG. 5, memory array 22 is shown with erasure blocks BLOCK0 through BLOCKn, each can be individually electrically erasable and programmable. FIG. 5 shows memory array 22 with block-sized file structure 30. In a block-sized file structure such as file structure 30, each of blocks BLOCK0 through BLOCKn becomes a storage unit for storing data and code files. A data or code file is stored in a first available block. If the block is not big enough to store the entire file, the remaining portion of the file is then stored in the next available block, etc. When a file or a portion of the file does not occupy the entire storage space of a block, the unoccupied space of that block will not be used to store other data file or files. This simplifies file structure 30 and eliminates file reallocation process when a block is to be erased to reclaim the dirty space. As is known, a programmed block cannot be reprogrammed with new data without a prior erasure. For example, when all of the blocks BLOCK0 through BLOCKn are initially erased blocks and file 1 is to be stored in memory array 22, file 1 is then stored in BLOCK0 and BLOCK1 contiguously.

Because the storage space of BLOCK0 and BLOCK1 combined is larger than file 1, BLOCK1 thus includes unoccupied or unused space 31. As can be seen from FIG. 5, unused space 31 of BLOCK1 does not store other data file or files. This is done by programming an identifier bit in each of blocks BLOCK0 and BLOCK1 to a programmed state. As can be seen from FIG. 5, each of blocks BLOCK0 through BLOCKn includes an identifier bit. For example, BLOCK0 includes identifier bit 40 and BLOCK1 includes identifier bit 41. The identifier bit for a particular block is implemented by a memory cell in that particular block. The programmed state of the identifier bit indicates that the associated block has stored data and can no longer store data no matter whether the block still includes unused space or not. The erased state of the identifier bit indicates that the associated block is available for data storage.

For one embodiment, the identifier bit in each block of memory array 22 is a first accessible memory cell of the respective block. Alternatively, the identifier bit can be any other memory cell within the memory block. Furthermore, the identifier bit can be stored in more than one memory cell of that block.

Moreover, each of blocks BLOCK0 through BLOCKn also includes a file ID field for storing the file identification of the file stored in the respective block. For example, BLOCK0 includes a file ID field 60 and BLOCK1 includes a file ID field 61. As described above, the file ID field of a block is used to store the file identification of the file or a portion ("ID") of the file stored in that block. For example, file ID field 60 stores the file identification of file 1 and file ID field 61 also stores the file ID of file 1. The use of a file ID field in each block allows files stored in memory array 22 to be retrieved and reorganized without a file allocation table. The file ID field in each of block can link all the portions of a file stored in various blocks together. This allows those portions of the file to be sequentially read from the respective blocks without a separate file allocation table that stores the file allocation information for the file. For example, when file 4 is stored in blocks BLOCK4 through BLOCK6, file ID fields 64 through 66 are then stored with the file ID of file 4. When file 4 needs to be read, flash file drive 23 of FIG. 3 simply accesses memory array 22 to sequentially read the blocks that store the file ID of file 4. In this case, blocks BLOCK4 through BLOCK6 are read. When, for example, the portion of file 4 that is stored in BLOCK5 is erased, flash file drive 23 can still read file 4 from blocks BLOCK4 and BLOCK6 and file 4 is still linked even though BLOCK5 is erased. No file allocation table is required to link all the portions of file 4 stored in memory array 22 and no file reallocation is needed when a block is erased.

The file ID field of a block may also store other information of the file stored in the block. For example, the file ID field for a block may store date and time of a file stored in the particular block.

The file ID assigned to a file to be stored in memory array 22 can be chronological, alphabetic, or numerical value. For example, file 1 can be assigned an ID of numerical one or alphabetic A and file 2 can be assigned an ID of numerical two or alphabetic B. When file 1 is stored in blocks BLOCK0 and BLOCK1, the numerical ID or alphabetic ID of file 1 is then stored in file ID fields 60 and 61. This structure allows data files to be read sequentially in accordance with the file ID stored in the blocks of memory array 22. In addition, this structure allows random data file deletions by block erasure to result in an automatic file restructuring on memory array 22.

For one embodiment, the file ID field in each block can be implemented by a number of memory cells in the block. The number of memory cells that are specified as the file ID field can be located adjacent to the identifier bit in each block. Alternatively, the number of memory cells can be located anywhere within the block.

Flash file drive 23 of FIG. 3 assigns the file ID to each file to be stored in memory array 22 with sequential value. When the file ID is a numerical value, the first file stored in memory array 22 will be assigned with an ID of numerical one, etc. When there are sixteen files stored in memory array 22, the file ID assigned for the sixteenth file will be numerical sixteen. When a new file is then stored in memory array 22, the new file will be assigned a file ID of numerical seventeen, regardless where the file is stored. However, when the sixteenth file has been deleted prior to storing the new file, the file ID of the new file will be numerical sixteen. When sixteen files have been stored in memory array 22 and files 2 and 4 have been deleted, the new file will still obtain the file ID of numerical seventeen, regardless where the new file is stored.

For one embodiment, memory array 22 has a cycling capacity (i.e., the number of erasure programming cycles) of 10,000. When the file ID number reaches that value, a mechanism is provided to trigger an automatic array erasure to erase the entire array of memory array 22. After that, the file ID assignment starts from numerical one. This mechanism can be implemented by any known techniques or circuits.

As can be seen from FIG. 5, when BLOCK0 and BLOCK1 are programmed with file 1, identifier bits 40 and 41 are also programmed to the programmed state and file ID files 60 and 61 are programmed with the file ID of file 1. As described above, flash file drive 23 assigns sequential file IDs to the files sequentially stored in memory array 22. As is known, the programmed state of a memory cell stores a logical zero value and the erased state of a memory cell stores a logical one value. This simplifies the process of marking BLOCK0 and BLOCK1 as occupied blocks. The simplification in the process substantially reduces the processing time of microcontroller 21 (FIG. 3) in running flash file drive 23 (FIG. 3), which in turn increases the overall system performance of flash EPROM 20.

In addition, by storing the file ID in each of blocks BLOCK0 and BLOCK1, file 1 can be easily identified and read. Moreover, this causes no separate file allocation information to be stored in memory array 22. This not only eliminates storage space required for storing a separate file allocation information to manage the files stored in memory array 22, but also reduces the processing power required to handle the file allocation information. When file 2 is received, file 2 is then stored in BLOCK2. Flash file drive 23 of FIG. 3 locates BLOCK2 to store file 2 by first accessing identifier bits 40 and 41. When flash file drive 23 finds out that identifier bits 40 and 41 are in the programmed state (i.e., the logical zero value), flash file drive 23 then moves to access identifier bit 42 of BLOCK2. When flash file drive 23 finds out that identifier bit 42 is in the erased state (i.e., logical one value), BLOCK2 is located to store file 2. In addition, flash file drive 23 assigns a file ID for file 2 and stores the file ID in file ID field 62 of BLOCK2. Flash file drive 23, however, does not need to access a file allocation table that might otherwise be required to find out which block is the next unused block. This simplifies the process of locating the unused block in memory array 22 to store a file and reduces the execution time of flash file drive 23 by microcontroller 21.

When BLOCK2 undergoes the programming operation to store file 2, identifier bit 42 is also programmed to the programmed state to indicate that BLOCK2 stores data and is no longer available to store other data file or files even though BLOCK2 is not completely occupied by file 2. As can be seen from FIG. 5, because the storage space of BLOCK2 is larger than file 2, BLOCK2 includes unused space 32. Again, unused space 32 of BLOCK2 does not store other data file or files. In addition, the file ID of file 2 is stored in file ID field 62 in order for file 2 to be later identified and read without a separate file allocation table.

When file 3 is received, unused space 32 of BLOCK2 will not be used to store file 3. Instead, BLOCK3 is located to store file 3. FIG. 5 shows memory array 22 when file 3 has been deleted from BLOCK3 by a block erasure of BLOCK3.

When a file stored in a block needs to be deleted, the block then simply undergoes a block erasure operation. The block erasure also erases the programmed state of the identifier bit for that block. No file reallocation is needed and no update is needed for a file allocation table. This significantly simplifies the clean-up operation of memory array 22. As is known, the clean-up operation for a prior art file structure typically involves heavy file reallocation and requires balanced cycling among the blocks. The simplified clean-up operation substantially reduces the processing of flash file drive 23 by microcontroller 21 and the memory operations on memory array 22.

For one embodiment, when BLOCK3 is erased after storing file 3 and the block adjacent to BLOCK6 remains initially unused, that block becomes the first unused block when flash file drive 23 accesses memory array 22 to store another file (i.e., file 5). For this embodiment, flash file drive 23 first reaches the first unused block after the last occupied block. If the last occupied block is BLOCKn, then flash file drive 23 locates the first unused block after BLOCK0. In this way, balanced cycling among the blocks can be achieved. As is known, an erasure block has a limited number of the erasure/programming cycles. In addition, restrictions are also applied to the erasure/programming cycling of adjacent blocks. Therefore, it is desirable to achieve balanced cycling among the blocks of memory array 22.

As can be seen from FIG. 5, when flash file drive 23 needs to read file 4, flash file drive 23 uses the file ID of file 4 which can be numerical four or alphabetic D to compare with the file ID stored in each block of memory array 22 until the two match. When the two match, the file is found and flash file drive 23 then sequentially reads the file from blocks BLOCK4 through BLOCK6.

When, for example, the portion of file 4 stored in BLOCK5 needs to be deleted. BLOCK5 is simply erased and file 4 stored in BLOCK4 and BLOCK6 can still be retrieved without file reallocation. BLOCK5 can then be used to store other files. When flash file drive 23 again accesses memory array 22 to read file 4, flash file drive 23 will sequentially access BLOCK4 and BLOCK6 for file 4.

Thus, by structuring memory array 22 of flash EPROM 20 with block-sized file structure 30 as shown in FIG. 5, file reallocation is not required when a block undergoes an erasure operation to delete a file. In addition, no separate storage space is needed for a file allocation table. This therefore increases the system performance of flash EPROM 20 of FIG. 3 and reduces the storage requirement for the file allocation information for the files stored in memory array 22. In addition, the elimination of file reallocation process in file structure 30 when a block is to be erased also reduces the processing power required for microcontroller 21 of FIG. 3.

Figure 6:
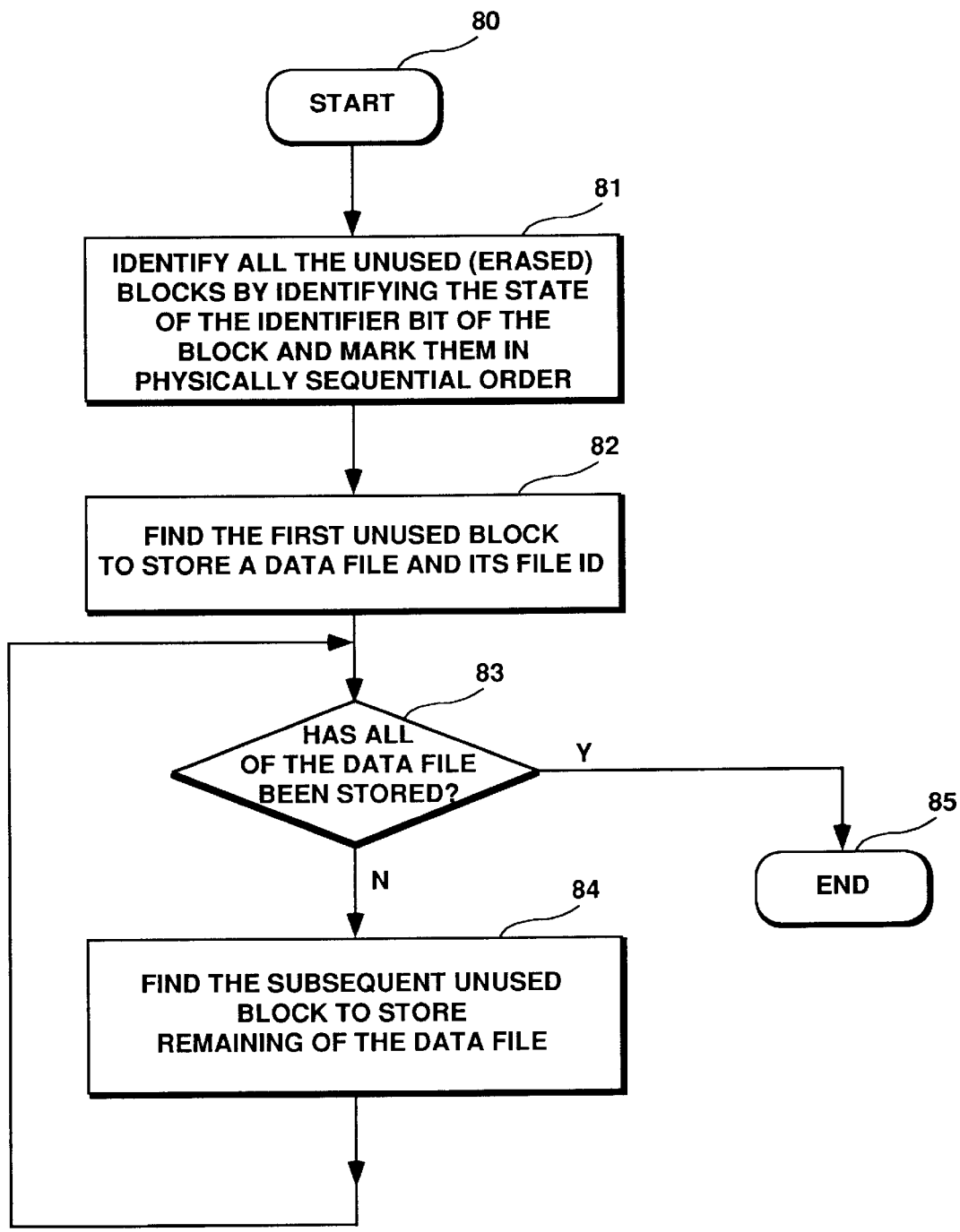
FIG. 6 shows the flow chart of the process employed by the flash file drive of the flash memory of FIG. 3 for managing files stored in the memory array of FIGS. 3 and 4 with the block-sized file structure shown in FIG. 5.

Referring now to FIG. 6, the process of flash file drive 23 for managing file stored in block-sized file structure 30 of FIG. 5 is shown. The process starts at step 80. At step 81, all the unused blocks of memory array 22 (FIGS. 3–5) are identified. Flash file drive 23 identifies these unused blocks by accessing the identifier bit in each of the blocks of memory array 22 to identify the state of the bit. If the identifier bit of a block is in the erased state, that block is unused. If the identifier bit of a block is in the programmed state, that block is occupied with data. In addition, flash file drive 23 marks those unused blocks in physically sequential order. The process then goes to step 82.

At step 82, the first unused block in the sequential order is located to store a data file received in flash EPROM 20 (FIG. 3). In addition, the identifier bit of that block is programmed to the programmed state as the file is stored in the block. This ensures that the block will not be accessed to store other data file or files when the file does not occupy the entire storage space of the block. Moreover, the file ID of the file is stored in the file ID file of the block. Step 83 is a judgment step at which a judgment is made to determine if the data file is completely stored in the block. If the answer is yes, the process then ends at step 85. If, however, the answer is no, which means that the data file cannot be completely stored in the block, the process then goes to step 84. At step 84, a subsequent unused block is located to store the remainder of the data file. The identifier bit of that subsequent unused block is also programmed to the programmed state at step 84. The process then returns to step 83 until the data file has been completely stored.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory management method for a nonvolatile memory having a plurality of blocks each of which can be electrically erased and programmed, comprising the steps of:

(A) receiving a data file to be stored in the nonvolatile memory;

(B) locating a number of blocks from the plurality of blocks that are available for data storage for storing the data file therein;

(C) storing the data file in a first block of the number of blocks if the size of the data file is smaller than or equal to the total storage space of the first block, wherein any unoccupied space of the first block by the data file is not used to store other data files such that no file reallocation is needed when the first block is erased;

(D) sequentially storing the data file in the first block and a second block of the number of blocks if the size of the data file is larger than the total storage space of the first block but smaller than the total storage space of the first and second blocks, wherein any unoccupied space of the second block by the data file is not used to store other data files such that no file reallocation is needed when the second block is erased;

(E) storing an identifier bit in each of the plurality of blocks, said identifier bit operable to be set in a first state and a second state, said first state indicating that the respective one of the plurality of blocks contains a portion of a data file in at least a portion of the respective block and that a portion of a different data file cannot be stored in the respective block; and (F) storing a file identification value in each of said plurality of blocks that contains a portion of a data file, said file identification value identifying the data file stored in the corresponding block of said plurality of blocks.

2. The memory management method of claim 1, wherein the identifier bit in each of the plurality of blocks is a first addressable memory cell of the respective one of the plurality of blocks.

3. The memory management method of claim 1 wherein the file identification value is stored adjacent to said identifier bit in each block.

4. The memory management method of claim 1, wherein the first state is a programmed state and the second state is an erased state.

5. The memory management method of claim 4, wherein the step (B) further comprises the step of identifying the number of blocks by determining if the identifier bit of each of the number of blocks is in the erased state.

6. The memory management method of claim 5, wherein the step (C) further comprises the step of programming the identifier bit of the first block to the programmed state to indicate that the first block no longer belongs to the number of blocks that are available for data storage.

7. The memory management method of claim 6, wherein the step of sequentially storing the data file in the first and second blocks further comprises the step of programming the identifier bit in each of the first and second blocks to the programmed state to indicate that each of the first and second blocks no longer belongs to the number of blocks that are available for data storage.

8. A memory management method for a nonvolatile memory having a plurality of blocks each of which can be electrically programmed and erased, comprising the steps of:

(A) establishing an identifier bit in each of the plurality of blocks to indicate if the respective block of the plurality of blocks is available for data storage, wherein if the identifier bit is in a first state, the respective block of the plurality of blocks contains a portion of a data file in at least a portion of the respective block and a portion of a different data file cannot be stored in the respective block, and wherein if the identifier bit is in a second state, the respective block of the plurality of blocks does not contain a portion of a data file in at least a portion of the respective block and a portion of any data file can be stored in the respective block:

(B) locating a number of blocks from the plurality of blocks that have their respective identifier bit in the second state;

(C) receiving a data file to be stored in the nonvolatile memory;

(D) if the size of the data file is smaller than the total storage space of a first block of the number of blocks, then storing the data file in the first block and changing the identifier bit of the first block from the second state to the first state to cause unoccupied space of the first block by the data file not to store other data files such that no file reallocation is needed when the first block is then erased; and (E) storing a file identification value in each of said plurality of blocks that contains a portion of a data file, said file identification value identifying the data file stored in the corresponding block of said plurality of blocks.

9. The memory management method of claim 8 further comprising the step of, if the size of the data file is larger than the total storage space of the first block but smaller than the total storage space of the first block and a second block of the number of blocks, sequentially storing the data file in the first and second blocks and changing the identifier bit of each of the first and second blocks from the second state to the first state to cause unoccupied space of the second block by the data file not to store other data files such that no file reallocation is needed when the second block is to be erased.

10. The memory management method of claim 8, wherein the first state is a programmed state and the second state is an erased state.

11. The memory management method of claim 8, wherein the step (B) further comprises the step of accessing the identifier bit of each of the plurality of blocks to identify the number of blocks.

12. The memory management method of claim 8, wherein the identifier bit in each of the plurality of blocks is a first addressable memory cell of the respective one of the plurality of blocks.

13. A data storage system, comprising:
(A) a nonvolatile memory array that comprises
   (i) a plurality of blocks, each being electrically erasable and programmable;
   (ii) an identifier bit in each of the plurality of blocks for indicating if the respective block of the plurality of blocks contains a portion of a first data file in at least a portion of the respective block;
(B) a microcontroller for controlling memory operations of each of the plurality of blocks; and
(C) a memory management program operative on the microcontroller for managing data storage of the nonvolatile memory array, wherein the memory management program accesses the identifier bit in each of the plurality of blocks to locate a number of blocks from the plurality of blocks that are available for data storage, wherein if the size of the data file is smaller than or equal to the total storage space of a first block of the number of blocks, the memory management program (1) stores a data file in the first block, (2) changes the state of the identifier bit of the first block so as to cause unoccupied space in the first block by the data file not to store portions of other data files such that no file reallocation is needed when the first block is erased, and (3) stores a file identification value in each of said plurality of blocks that contains a portion of a data file, said file identification value identifying the data file stored in the corresponding block of said plurality of blocks.

14. The data storage system of claim 13, wherein if the size of the data file is larger than the total storage space of the first block but smaller than the total storage space of the first block and a second block of the number of blocks, the memory management program then (1) stores the data file in the first and second blocks and (2) changes the state of the identifier bit of each of the first and second blocks so as to cause unoccupied space in the second block by the data file not to store other data files such that no file reallocation is needed when the second block is then erased.

15. The data storage system of claim 13, wherein when the identifier bit of one of the plurality of blocks is in a programmed state, the respective one of the plurality of blocks is not available for data storage, wherein when the identifier bit of one of the plurality of blocks is in an erased state, the respective one of the plurality of blocks is available for data storage.

16. The data storage system of claim 13, wherein the identifier bit in each of the plurality of blocks is a first addressable memory cell of the respective one of the plurality of blocks.

17. The data storage system of claim 13, wherein the identifier bit in each of the plurality of blocks is a last addressable memory cell.

18. The data storage system of claim 13 wherein the file identification value is stored adjacent to said identifier bit in each block.

19. A memory device residing on a single semiconductor substrate, comprising:
(A) a nonvolatile memory array that comprises
   (i) a plurality of blocks, each being electrically programmable and erasable;
   (ii) an identifier bit in each of the plurality of blocks for indicating if the respective block of the plurality of blocks contains a portion of a first data file in at least a portion of the respective block;
(B) a microcontroller for controlling memory operations of each of the plurality of blocks; and (C) a memory management system stored in the memory array and operative on the microcontroller for managing data storage of the memory array, wherein the memory management system locates a first block of the plurality of blocks that is available for data storage by accessing the identifier bit of the first block, wherein the memory management system changes the state of the identifier bit of the first block when the first data file is stored in the first block such that a portion of a second data file cannot be stored in the first block even though the first block includes storage space unoccupied by the first data file so that no file reallocation is needed when the first block is erased, and wherein the memory management system further stores a file identification value in each of said plurality of blocks that contains a portion of a data file, said file identification value identifying the data file stored in the corresponding block of said plurality of blocks.

20. The memory device of claim 19, wherein when the identifier bit of one of the plurality of blocks is in a programmed state, the respective one of the plurality of blocks is not available for data storage, wherein when the identifier bit of one of the plurality of blocks is in an erased state, the respective one of the plurality of blocks is available for data storage.

21. The memory device of claim 20, wherein the memory management system programs the identifier bit of the first block into the programmed state when the first data file is stored in the first block, wherein the identifier bit of the first-block is erased into the erased state when the first block is erased such that the memory management system requires minimized storage space to store and minimized processing power to operate.

22. A memory device residing on a single semiconductor substrate, comprising (A) a nonvolatile memory array that comprises a plurality of blocks, each being electrically programmable and erasable, wherein each of the plurality of blocks includes an identifier bit;

(B) a microcontroller for controlling memory operations of each of the plurality of blocks; and (C) a memory management system stored in the memory array and operative on the microcontroller for managing data storage of the memory array, wherein the memory management system locates a first block of the plurality of blocks that is available for data storage by accessing the identifier bit of the first block, wherein the memory management system changes the state of the identifier bit of the first block when a portion of a first data file is stored in the first block such that a portion of a second data file cannot be stored in the first block even though the first block includes storage space unoccupied by the data file so that no file reallocation is needed when the first block is erased, and wherein the memory management system assigns a file identifier to the data file when the data file is stored by the memory management system in a number of the plurality of blocks such that no file allocation table is required to retrieve the data file even when some of the number of the plurality of blocks are erased.

23. The memory device of claim 22 wherein the file identification value is stored adjacent to said identifier bit in each block.

* * * * *